W. STAUFFER.
Grist Alarm.
No. 18,163.                    Patented Sept. 8, 1857.
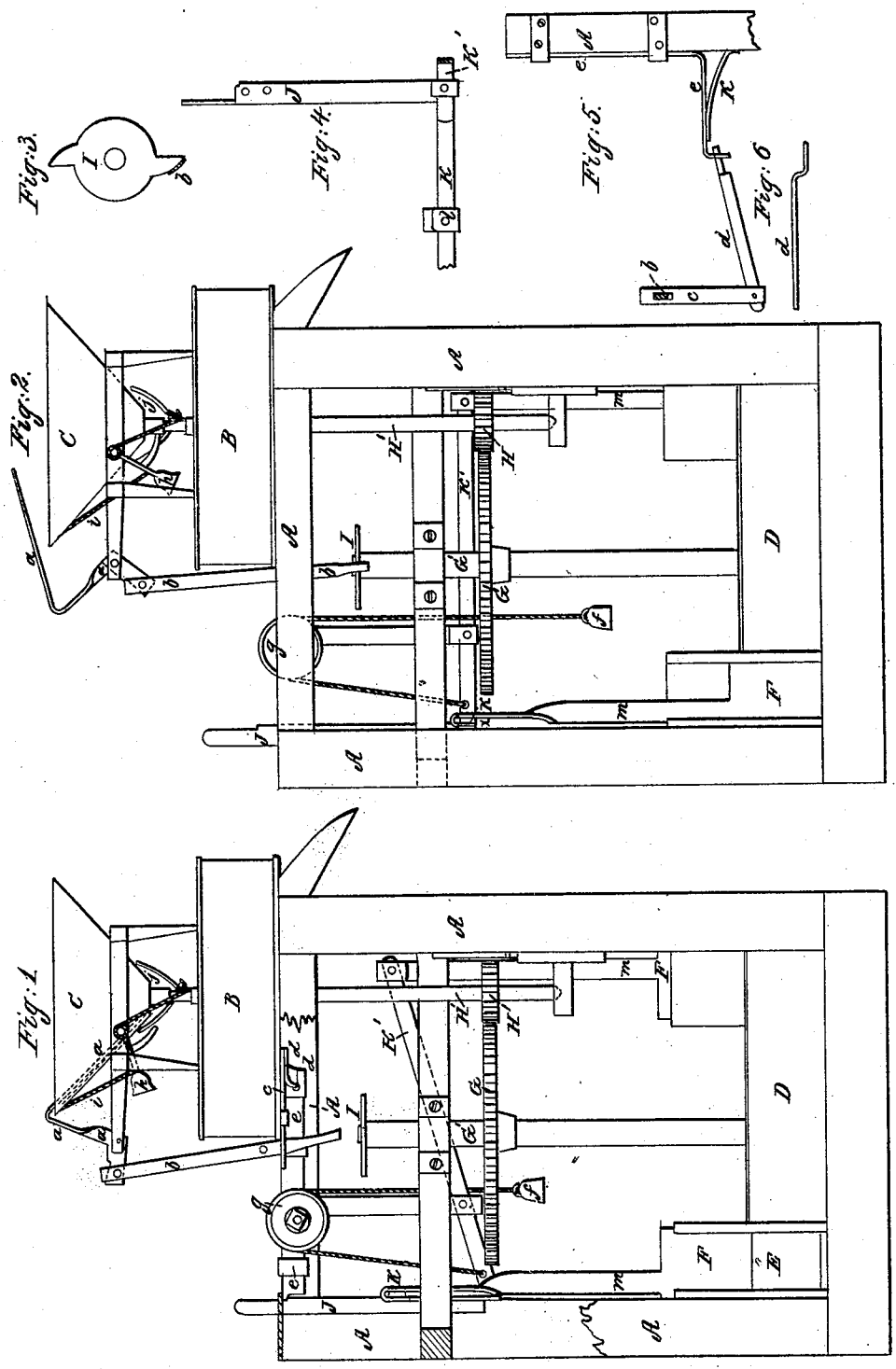

UNITED STATES PATENT OFFICE.

WM. STAUFFER, OF MIDDLEBURY, INDIANA.

GRINDING-MILL.

Specification of Letters Patent No. 18,163, dated September 8, 1857.

*To all whom it may concern:*

Be it known that I, WILLIAM STAUFFER, of Middlebury, in the county of Elkhart and State of Indiana, have invented a new and useful Improvement in Grinding-Mills; and I do hereby declare that the following is a full and exact description thereof, reference being had to the accompanying drawings, making a part of this specification, Figures 1 and 2 being side views of my improved mill, and Figs. 3, 4, 5, and 6 detached portions thereof.

Similar letters indicate the same parts in each drawing.

In Figs. 1 and 2, C, represents the hopper, in which the grain is placed to be ground. B, the case in which the grinding stones are placed.

H', is the shaft to which one of the stones is attached, and is made to revolve by connection with the shaft G', the two being connected by the cog gearing G, H. The said shaft G', is revolved by being connected with the water-wheel inclosed in the case D, as shown in the drawings.

A, A, represents the frame of my improved mill, which may be made of any suitable material.

The object of my invention is to notify the attendant of the mill, when the grain is nearly run out of the hopper, and to also stop the motion of the mill, when the grain has all been ground, should the attendant not be near to arrest the motion of the mill. This is accomplished as follows: A projecting arm $a$, Figs. 1, and 2, is placed within the hopper (C,) and attached to the mill by suitable mechanism. This arm is made to lie on one side of the hopper by the weight of the grain therein; and when the grain is run out, the said arm necessarily rises, and in so doing, causes the arm $b$, to descend (see Figs. 1, and 2,) which arm comes in contact with the cam I (Figs. 1, 2, and 3,) on the top of the revolving shaft G, which cam gives the arm $b$, a lateral motion, which causes the lever $c$, to slide and allows the beam J, to rise; and by the arrangement of the said beam J, with the rod $m$, of the gate F, of the water-wheel, in combination with the connecting beam K', the weight $f$, and the roller $g$, it causes the rod $m$, to descend and stop the flow of water to the wheel, by the gate F, being shut down in the flume E, as is clearly shown in Fig. 2. The connecting beam K', is attached to another gate, on the other side of the mill as shown in the drawings. It will thus be perceived, by this simple arrangement that the motion of the mill will always be arrested when the grain in the hopper is all ground. The connections of the arms, beams and levers to effect this, is effective as is shown in the drawings. I arrange a bell $h$, which is connected to the shaft $j$, by means of a cord $i$, and is arranged with the springs, as shown, which notifies the operator or attendant of the mill, when the grain is nearly out of the hopper, and allows him to attend to it. But even should he not hear the bell, the mill will stop itself as above shown, and prevent damage being done.

The detached views of various parts of the mill, clearly show how they are to be made; so a mechanic of ordinary ingenuity could easily construct the mill.

Fig. 2 shows the mill when stopped by its own mechanism, and the arrangement of the rods and beams to effect it; and Fig. 1, shows the mill, when working, and how the combination is effected to stop it. The drawings represent my invention so clearly that I do not deem it necessary to further describe my improved mill.

What I claim as my invention and desire to secure by Letters Patent, is—

1. The combination and arrangement of the arm $a$, with the arm $b$, and the sliding rod $e$, together with the cam I, on the shaft G', the beam J, the rod $m$, the weight $f$, and the connecting beam K', for the purpose of arresting the motion of the mill, substantially in the manner herein shown.

2. I also claim the arrangement of the cord $i$, with the shaft $j$, and the springs, for the purpose of ringing the bell $h$, to notify the attendant when the grain is nearly run out of the hopper, substantially as herein set forth.

WM. STAUFFER.

Witnesses:
JOHN H. WISE,
JOHN S. HOLLINGSHEAD.